(12) United States Patent
Oklejas, Jr. et al.

(10) Patent No.: US 10,906,000 B2
(45) Date of Patent: Feb. 2, 2021

(54) METHOD AND SYSTEM FOR PERFORMING REVERSE OSMOSIS WITH BRINE RECIRCULATION AND ENERGY RECOVERY

(71) Applicant: Fluid Equipment Development Company, LLC, Monroe, MI (US)

(72) Inventors: Eli Oklejas, Jr., Monroe, MI (US); Michael Anthony Gisclair, Kingwood, TX (US)

(73) Assignee: FLUID EQUIPMENT DEVELOPMENT COMPANY, LLC, Monroe, MI (US)

( * ) Notice: Subject to any disclaimer, the term of this patent is extended or adjusted under 35 U.S.C. 154(b) by 0 days.

(21) Appl. No.: 17/013,565

(22) Filed: Sep. 5, 2020

(65) Prior Publication Data

US 2020/0398224 A1    Dec. 24, 2020

Related U.S. Application Data

(63) Continuation of application No. 16/780,254, filed on Feb. 3, 2020, now Pat. No. 10,766,002.
(Continued)

(51) Int. Cl.
*B01D 61/08* (2006.01)
*B01D 61/02* (2006.01)
(Continued)

(52) U.S. Cl.
CPC .......... *B01D 61/08* (2013.01); *B01D 61/025* (2013.01); *B01D 61/06* (2013.01); *B01D 61/10* (2013.01); *B01D 61/12* (2013.01)

(58) Field of Classification Search
CPC ...... B01D 61/08; B01D 61/06; B01D 61/025; B01D 61/10; B01D 61/12
See application file for complete search history.

(56) References Cited

U.S. PATENT DOCUMENTS

| 6,139,740 A | * | 10/2000 | Oklejas | B01D 61/022 210/321.66 |
| 6,345,961 B1 | * | 2/2002 | Oklejas, Jr. | B01D 61/022 415/104 |

(Continued)

FOREIGN PATENT DOCUMENTS

| EP | 1902771 A2 | 3/2008 |
| WO | WO-2017-152226 A1 | 9/2017 |

OTHER PUBLICATIONS

International Search Report and Written Opinion in corresponding PCT Application No. PCT/US2020/016535 dated May 12, 2020.
U.S. Appl. No. 16/780,254, filed Feb. 3, 2020, Oklejas, Jr.

*Primary Examiner* — Krishnan S Menon
(74) *Attorney, Agent, or Firm* — Harness, Dickey & Pierce, P.L.C.

(57) ABSTRACT

A reverse osmosis system includes a membrane housing comprising a reverse osmosis membrane therein. The membrane housing comprising a feed fluid inlet, a brine outlet and a permeate outlet. A first turbocharger has a first pump portion and a first turbine portion. The brine outlet is coupled to a first pipe directing a first portion of brine to the first pump portion. The first pump portion is in fluid communication with the feed fluid inlet. A feed pump communicates feed fluid to the feed fluid inlet through the first turbine portion. The brine outlet is coupled to a second pipe directing a second portion of brine toward a drain through a brine control valve.

11 Claims, 3 Drawing Sheets

Related U.S. Application Data

(60) Provisional application No. 62/800,667, filed on Feb. 4, 2019.

(51) Int. Cl.
    *B01D 61/10*       (2006.01)
    *B01D 61/12*       (2006.01)
    *B01D 61/06*       (2006.01)

(56) References Cited

U.S. PATENT DOCUMENTS

| | | | |
|---|---|---|---|
| 10,766,002 B2 | 9/2020 | Oklejas, Jr. et al. | |
| 2008/0105617 A1* | 5/2008 | Oklejas | C02F 1/441 210/637 |
| 2011/0198290 A1* | 8/2011 | Oklejas, Jr. | C02F 1/441 210/652 |
| 2012/0285886 A1* | 11/2012 | Liberman | B01D 61/002 210/636 |
| 2013/0306568 A1* | 11/2013 | Oklejas, Jr. | B03D 1/1456 210/703 |
| 2015/0352497 A1* | 12/2015 | Sakai | C02F 1/441 210/252 |

* cited by examiner

METHOD AND SYSTEM FOR PERFORMING REVERSE OSMOSIS WITH BRINE RECIRCULATION AND ENERGY RECOVERY

RELATED APPLICATIONS

This application is a continuation of U.S. Ser. No. 16/780,254, filed Feb. 3, 2020 (now U.S. Pat. No. 10,766,002) which is a non-provisional application of U.S. Ser. No. 62/800,667, filed Feb. 4, 2019, the disclosures of which are incorporated by reference herein.

TECHNICAL FIELD

The present disclosure relates generally to reverse osmosis systems, and, more specifically, to a method and system for providing brine recirculation during a reverse osmosis process.

BACKGROUND

The statements in this section merely provide background information related to the present disclosure and may not constitute prior art.

Reverse osmosis systems use a membrane to separate a stream of liquid (feed) containing dissolved solids into two streams. The first stream is a pure liquid that is formed by passing fluid through the membrane of the reverse osmosis system. A second stream of liquid also leaves the membrane housing 12 and has a higher concentration of dissolved solids, which is referred to as brine or reject.

Before reaching the membrane housing 12, the liquid, such as sea water, has been filtered so that large suspended particles have been removed. It has been found that by recirculating a portion of the brine with and incoming feed to the membrane, the amount of permeate to be extracted from a given volume of feed membrane performance can be increased. Providing the brine to the feed input is referred to as "brine recirculation". Typically, the pressure differential between the feed and the brine is relatively small (about 1 bar to 3 bar).

Systems that operate at very high pressures (exceeding 100 bar) often require brine recirculation. Consequently, the equipment used in such systems must be designed for accommodating such pressures. Typically, to accommodate high pressures, the rating of the pump must be suitable to accommodate the pressures. Also, the shaft seals for high pressure pumps are prone to frequent failures. Special motors must also be provided to handle high thrust loads generated by the high working pressure. Such systems are also prone to premature bearing failure. Variable frequency drives are also required for driving the external motors to allow variations in the flow rates. All of these features add to the expense and complexity of the reverse osmosis system.

Referring now to FIG. 1, a reverse osmosis system 10 according to the prior art is set forth. The reverse osmosis system 10 has a reverse osmosis membrane housing 12 that has a membrane 14 disposed therein. The membrane housing 12 has a feed fluid input 12A, a brine fluid outlet 12B, and a permeate outlet 12C. As briefly mentioned above, feed fluid enters the feed fluid input 12A and, with the membrane 14, divides the fluid into a permeate stream exiting the membrane housing 12 at the permeate outlet 12C and a brine stream at the brine outlet 12B. Feed fluid is provided to the feed fluid inlet 12A through a high pressure pump 16. A valve 18 may be used to regulate the feed pressure in the flow rate.

The brine outlet 12B and the brine therein may be controlled by a valve 22. The depressurized brine is disposed in a drain 20.

Referring now to FIG. 2, a recirculation pump 30 may be disposed in a recirculation pipe 32 so that a portion of the brine exiting through the brine outlet 12B is communicated to the feed fluid inlet 12A. A combination of the recirculated brine and the brine from the feed pump 16 enter the feed fluid inlet 12A of the membrane housing 12.

Referring now to FIG. 3, the reverse osmosis system may also include a turbocharger 40 coupled to the brine outlet 12B by a pipe 42. In particular, the turbocharger 40 includes a turbine portion 40T and a pump portion 40P. The turbine portion 40T receives brine through the pipe 42 through a valve 46. The valve 46 provides flow and pressure regulation. The valve 46 and the turbine portion 40T receive the brine fluid, which operatively turns the turbine within the turbine portion 40T and thus provides a rotating force to the pump 40P. Feed fluid from the high pressure pump 16 and the valve 18 is received in the pump portion 40P. The pressure is increased to a level needed for the membrane 14 for optimal operation. The pressurized feed fluid that has been pressurized by the pump 16 and the pump portion 40P is received within the feed fluid inlet 40A. The purpose of the turbocharger 40 is to reduce the discharge pressure of the high pressure pump 16 to reduce energy. A pump with a lower pressure rating is also less costly. The shaft 48 between a motor 50 and the turbine portion 40T must include a shaft seal. The shaft penetrating the housing of the turbocharger 40 may be a source of potential shaft leakage regardless of the operating pressure. The motor 50 is driven by a variable frequency drive 52.

SUMMARY

The present disclosure provides a method and system for an improved reverse osmosis system with brine recirculation in an energy efficient manner.

In one aspect of the disclosure, a reverse osmosis system and a method of operating the same includes a membrane housing comprising a reverse osmosis membrane therein. The membrane housing has a feed fluid inlet, a brine outlet and a permeate outlet. A first turbocharger has a first pump portion and a first turbine portion. The brine outlet is coupled to a first pipe directing a first portion of brine to the first pump portion. The first pump portion is in fluid communication with the feed fluid inlet. A feed pump communicates feed fluid to the feed fluid inlet. The brine outlet is coupled to a second pipe directing a second portion of brine away from the first pump portion.

In another aspect of the disclosure, a method of operating a reverse osmosis system that has a feed fluid inlet, a brine outlet and a permeate outlet. The method has the steps of fluidically communicating a first portion of brine from the brine outlet to a first pump portion of a turbocharger, fluidically communicating the first portion of the brine from the first pump portion to the feed fluid inlet, fluidically communicating feed fluid from a feed pump to the feed fluid inlet and communicating a second portion of brine away from the first pump portion through a second pipe.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
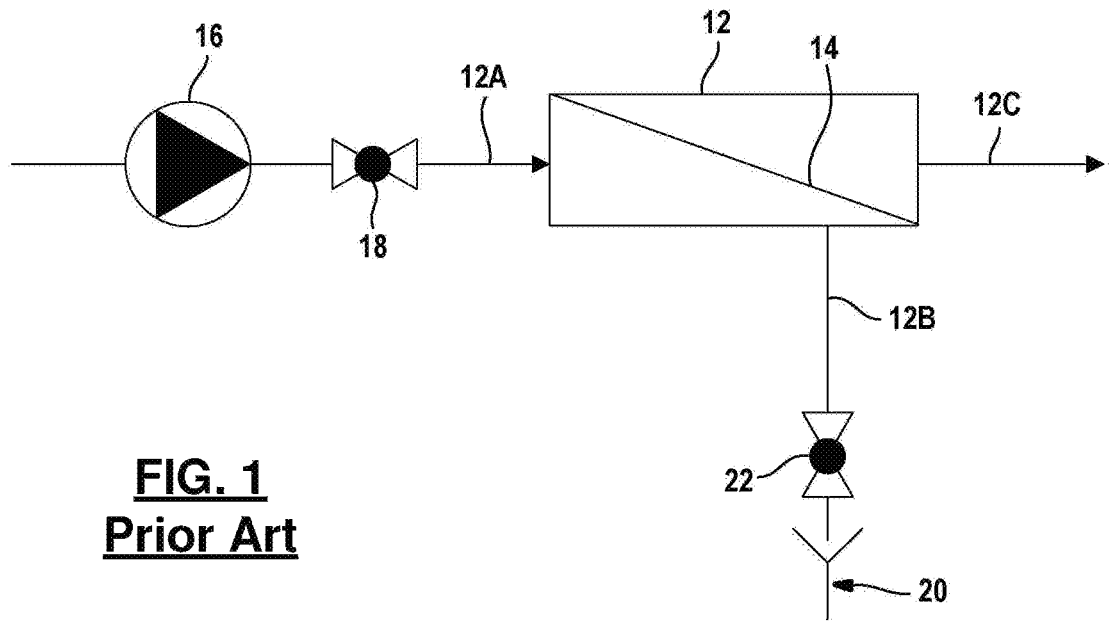
FIG. 1 is a schematic view of a reverse osmosis system according to the prior art.
Figure 2:
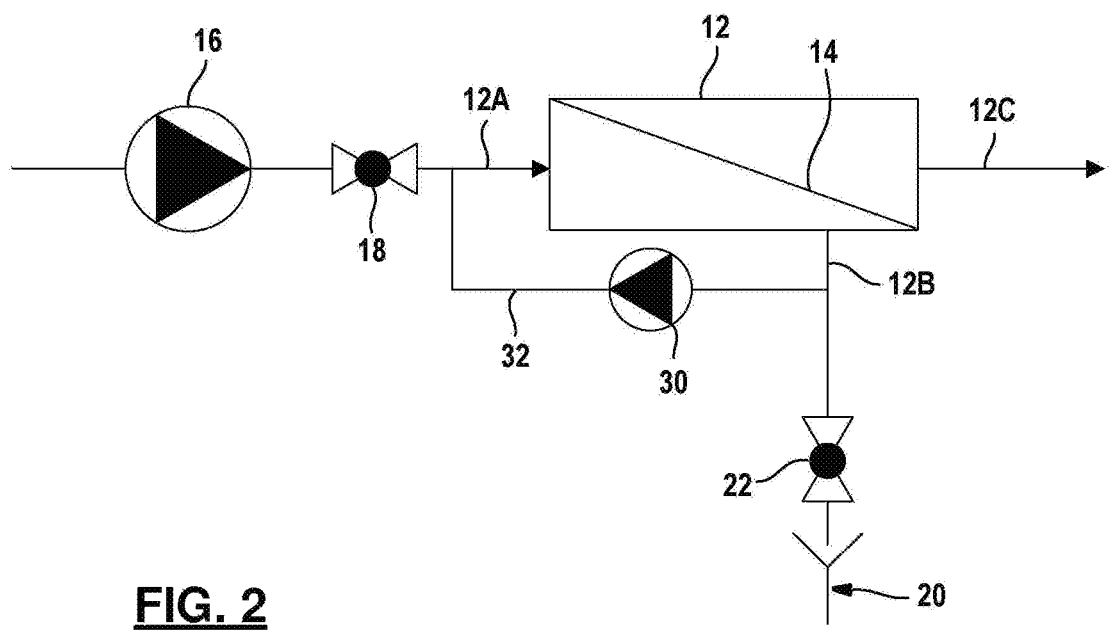
FIG. 2 is a second example of a reverse osmosis system according to the prior art.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 4:
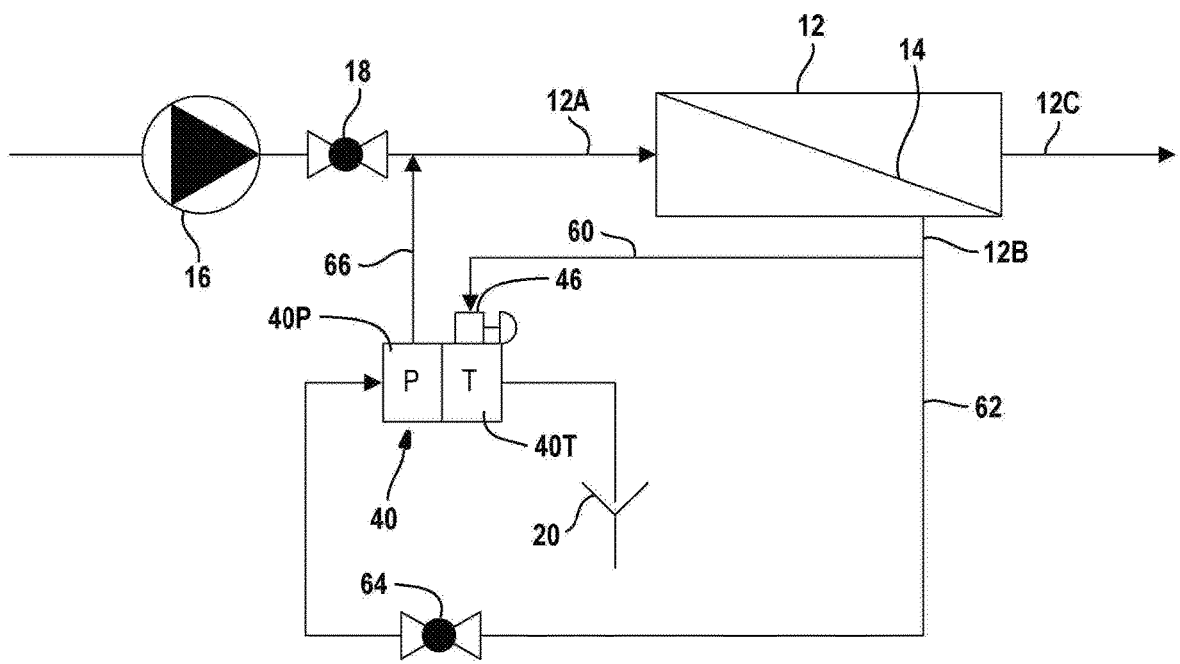
FIG. 4 is a schematic view of a first example of a reverse osmosis system according to the present disclosure.

Referring now to FIG. 4, a reverse osmosis system is illustrated. The same components from the prior discussed reverse osmosis systems are labeled the same. In this system, the brine outlet 12B is coupled to a first pipe 60 and a second pipe 62. The first pipe 60 communicates a portion of the brine fluid from the brine outlet 12B to the valve 46 and into the turbine portion 40T. The outlet of the turbine portion 40T enters the drain 20. In this example, the turbine portion 40T provides energy to the pump portion 40P. In this example, a second pipe 62 communicates a portion of brine fluid from the brine outlet 12B through a valve 64 which allows fluid to communicate into the pump portion 40P. The portion of the brine fluid in the pipe 60 is used for increasing the pressure of a second portion of the brine fluid within the pipe 62 that travels through the pump portion 40P. The pressurized fluid from the pump portion 40P travels through a pipe 66 and to the feed fluid inlet 12A where it is mixed with the feed fluid from the high pressure pump 16 and the valve 18. The control valve 5 may be used to control the amount of brine flow and pressure through the pipe 60. The recirculation flow can be regulated by the valve 64 in the pipe 62.

Figure 3:
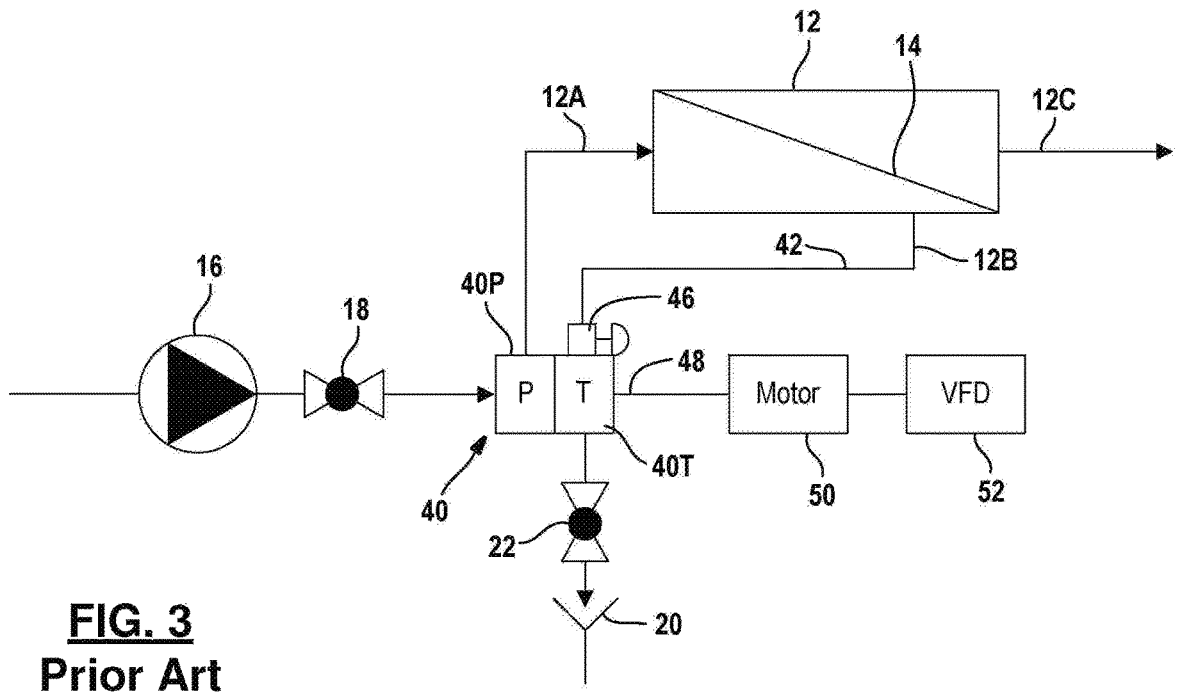
FIG. 3 is a third example of a reverse osmosis system with an energy recovery device according to the prior art.

The advantages of the system set forth in FIG. 4 include the benefits of eliminating a high-pressure shaft seal and the electric motor such as those illustrated in FIG. 3. Also, the energy is recovered from the brine stream that would otherwise be dissipated through the brine control valve 22 illustrated above. The system of FIG. 4 works under the conditions where the recirculation flow and the brine flow are similar. The system is less efficient when the recirculation flow and the brine flow through the pipe 60 are relatively close in volume rate and the pressure drop in the turbine portion 40T is relatively close the pressure rise in the pumps portion 40P.

Figure 5:
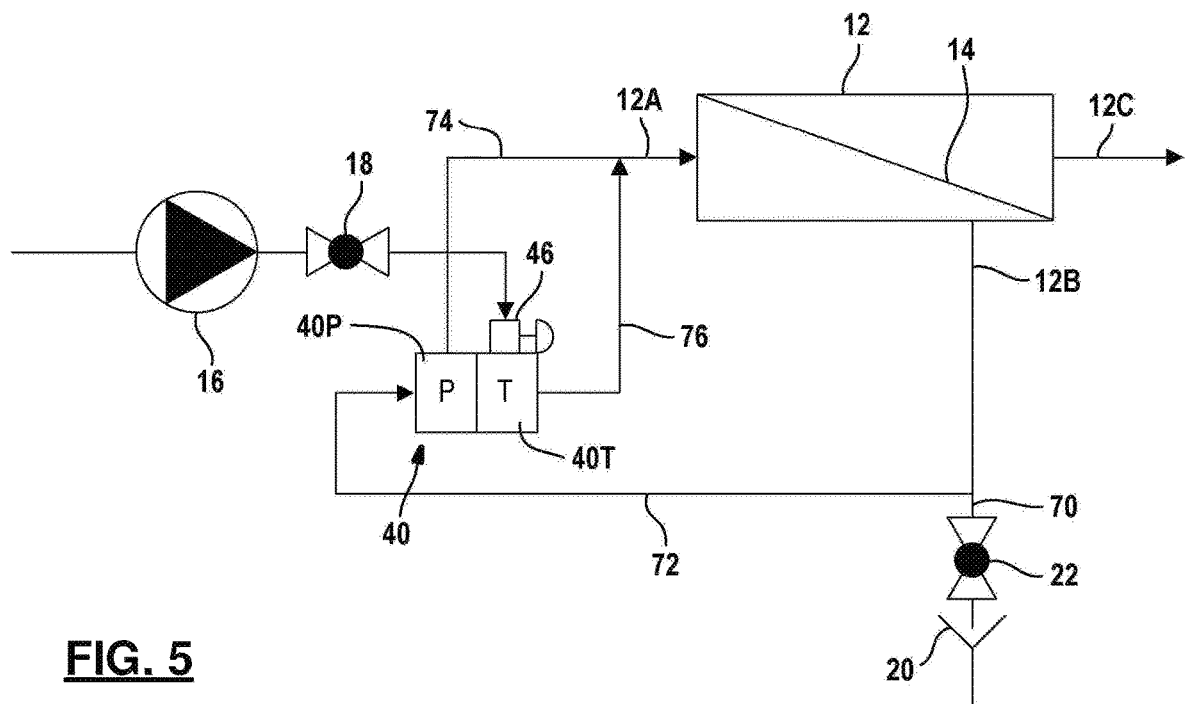
FIG. 5 is a schematic view of a second example of a reverse osmosis system according to the present disclosure.

Referring now to FIG. 5, a reverse osmosis system is fluidically coupled in a different manner. In this example, the brine outlet 12B is directed to a first pipe 70 which leads to the drain 20. A second pipe 72 from the brine outlet 12B is in communication with the pump portion 40P of the turbocharger 40. The brine fluid pressurized at the pump portion 40P is communicated to the feed fluid inlet 12A through a pipe 74.

The feed fluid from the high pressure pump 16 and the valve 18 is communicated to the turbine portion 40T of the turbocharger 40 through the valve 46. The pressure in the feed fluid is used to pressurize the brine recirculation fluid that is received through the pipe 72 and ultimately from the brine outlet 12B. The pipe 76 communicates the feed fluid from the turbine portion 40T to the inlet 12A. In operation, the turbocharger turbine portion 40T is handling a much larger flow which has a lower differential than the embodiments illustrated above. Because the flow and pressure differential through the pump portion 40P is close to that of the turbine portion 40T, a higher efficiency and more reliable operation may be provided. One drawback, however, is that some of the energy of the brine fluid through the pipe 70 is dissipated in the control valve 22 and thus is not used.

Figure 6:
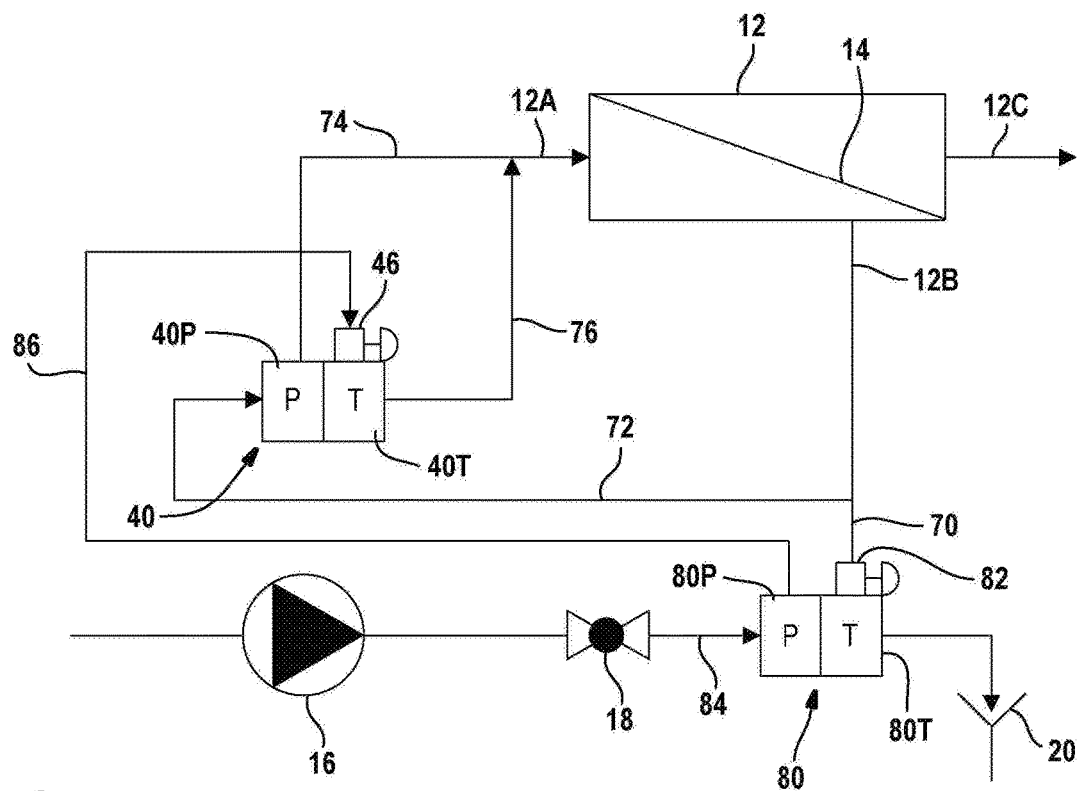
FIG. 6 is a schematic view of a third example of a reverse osmosis system according to the present disclosure.

Referring now to FIG. 6, a second turbocharger 80 is coupled to the pipe 70 illustrated above. An integral valve 82 and the turbine portion 80T of the turbocharger 80 may be incorporated to help regulate the flow through the turbine portion 80T. Thus, a portion of the brine fluid from the brine outlet 12B travels through the integral valve 82 into the turbine portion 80T where the energy therein is removed. The de-energized brine fluid is ultimately communicated to the drain 20. The pump portion 80P of the second turbocharger 80 is in fluid communication with the feed pump 16 and the valve 18 through the pipe 84. The energy from the brine fluid within the pipe 70 is used to rotate the turbine portion 80T which in turn adds pressure to the feed fluid from the pipe 84. The pressurized fluid from the pipe 84 travels to the pump portion 80P where the pressure is increased then travels through a pipe 86 to the turbine 40T. In contrast to FIG. 5, the feed fluid is first pressurized at the pump portion 80P where some of the brine pressure is converted into pressurizing the feed fluid. Pipe 86 fluidically communicates the pressurized feed fluid to the turbine portion 40T of the turbocharger 40 through the valve 46. In FIG. 6 brine energy recovery is performed. A full utilization of the brine hydraulic energy is used at the second turbocharger 80 while allowing brine recirculation using the turbocharger 40.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A reverse osmosis system comprising:
   a membrane housing comprising a reverse osmosis membrane therein, said membrane housing comprising a feed fluid inlet, a brine outlet and a permeate outlet;
   a first turbocharger comprising a first pump portion and a first turbine portion;
   said brine outlet coupled to a first pipe directing a first portion of brine to the first pump portion;
   said first pump portion in fluid communication with the feed fluid inlet; and a feed pump communicating feed fluid to the feed fluid inlet through the first turbine portion;

said brine outlet coupled to a second pipe directing a second portion of brine toward a drain through a brine control valve.

2. The reverse osmosis system of claim 1 wherein the feed pump is fluidically coupled to the first turbine portion through a first flow control valve.

3. The reverse osmosis system of claim 2 wherein the first flow control valve is integrally formed with the first turbine portion.

4. The reverse osmosis system of claim 2 wherein the feed pump is coupled to the first turbine portion through a feed control valve in series with the first flow control valve.

5. The reverse osmosis system of claim 1 wherein the feed pump is coupled to the first turbine portion through a feed control valve.

6. A method of operating a reverse osmosis system having a feed fluid inlet, a brine outlet and a permeate outlet, said method comprising:

fluidically communicating a first portion of brine from the brine outlet to a first pump portion of a turbocharger through a first pipe;

fluidically communicating the first portion of the brine from the first pump portion to the feed fluid inlet;

fluidically communicating feed fluid from a feed pump to the feed fluid inlet through a first turbine portion of a turbocharger; and communicating a second portion of brine from the first pump portion to a drain through a second pipe and a brine control valve.

7. The method of claim 6 further comprising communicating feed fluid from the feed pump to the feed fluid inlet through a first flow control valve.

8. The method of claim 6 further comprising communicating feed fluid from the feed pump to the feed fluid inlet through integrally formed with the first turbine portion.

9. The method of claim 6 further comprising communicating feed fluid from the feed pump to the feed fluid inlet through a feed control valve.

10. The method of claim 6 further comprising communicating feed fluid from the feed pump to the feed fluid inlet through a feed control valve in series with a first flow control valve.

11. The method of claim 6 further comprising communicating feed fluid from the feed pump to the feed fluid inlet through a feed control valve in series with a first flow control valve integrally formed with the first turbine portion.

* * * * *